US010356203B2

United States Patent
Beilin

(10) Patent No.: US 10,356,203 B2
(45) Date of Patent: Jul. 16, 2019

(54) FAULT-TOLERANT OPERATIONAL GROUP ON A DISTRIBUTED NETWORK

(71) Applicant: The Charles Stark Draper Laboratory, Inc., Cambridge, MA (US)

(72) Inventor: Samuel Beilin, Brighton, MA (US)

(73) Assignee: THE CHARLES STARK DRAPER LABORATORY, INC., Cambridge, MA (US)

(*) Notice: Subject to any disclaimer, the term of this patent is extended or adjusted under 35 U.S.C. 154(b) by 309 days.

(21) Appl. No.: 15/380,034

(22) Filed: Dec. 15, 2016

(65) Prior Publication Data

US 2018/0176107 A1 Jun. 21, 2018

(51) Int. Cl.
| | |
|---|---|
| *G06F 11/00* | (2006.01) |
| *H04L 29/08* | (2006.01) |
| *H04L 12/26* | (2006.01) |
| *H04L 12/40* | (2006.01) |
| *H04W 4/48* | (2018.01) |

(52) U.S. Cl.
CPC ............ *H04L 67/303* (2013.01); *H04L 12/40* (2013.01); *H04L 43/0817* (2013.01); *H04L 43/10* (2013.01); *H04L 43/106* (2013.01); *H04L 67/10* (2013.01); *H04W 4/48* (2018.02);
(Continued)

(58) Field of Classification Search
CPC ............. H04L 43/0817; H04L 43/0811; H04L 43/0805; H04L 43/106; H04L 43/10; H04L 2012/40215; H04L 2012/40273; H04L 12/40; G06F 11/1633; G06F 11/182; G06F 11/3048

See application file for complete search history.

(56) References Cited

U.S. PATENT DOCUMENTS

| 4,015,246 A | 3/1977 | Hopkins, Jr. et al. |
| 4,665,522 A | 5/1987 | Lala et al. |

(Continued)

FOREIGN PATENT DOCUMENTS

| EP | 2 085 839 | 8/2009 |
| EP | 2 953 295 | 12/2015 |
| WO | WO 2010/048048 | 4/2010 |

OTHER PUBLICATIONS

International Search Report and Written Opinion for PCT/US2016/068686 dated Sep. 12, 2017 entitled "Self-Configuring Fault-Tolerant Operational Group".

(Continued)

*Primary Examiner* — Marc Duncan

(74) *Attorney, Agent, or Firm* — Hamilton, Brook, Smith & Reynolds, P.C.

(57) ABSTRACT

In an embodiment of the present invention, a method receives, at a first node of multiple nodes, each node connected to a common network bus, a health message from a second node. The health message includes a log of health messages from other nodes. Each node sends health messages at a frequency known to the plurality of nodes. The method further compares, at the first node, the log of messages from other nodes in the received health message to a log of health messages previously received from other nodes stored by the first node. Based on the comparison, determining a health status of each node. Using embodiments of the present method and system, computing units can form dynamic fault-tolerant groups.

22 Claims, 11 Drawing Sheets

400

(52) U.S. Cl.
CPC .............. *H04L 12/40123* (2013.01); *H04L 2012/40215* (2013.01)

(56) References Cited

U.S. PATENT DOCUMENTS

| | | | |
|---|---|---|---|
| 4,907,232 | A | 3/1990 | Harper et al. |
| 4,937,741 | A | 6/1990 | Harper et al. |
| 5,210,871 | A | 5/1993 | Lala et al. |
| 5,537,583 | A | 7/1996 | Truong |
| 6,018,812 | A | 1/2000 | Deyst, Jr. et al. |
| 6,970,045 | B1 | 11/2005 | Lichter et al. |
| 7,383,474 | B2 * | 6/2008 | Sekizawa ............ G06F 11/3006 399/8 |
| 8,150,800 | B2 | 4/2012 | Webman et al. |
| 8,964,625 | B2 | 2/2015 | Cemper |
| 8,972,772 | B2 | 3/2015 | Beilin et al. |
| 9,817,741 | B2 * | 11/2017 | Mucke ..................... H04L 43/10 |
| 2003/0158936 | A1 * | 8/2003 | Knop ....................... H04L 29/06 709/224 |
| 2004/0167912 | A1 | 8/2004 | Tsui |
| 2008/0040628 | A1 * | 2/2008 | Mandal ............... H04L 41/0677 714/4.1 |
| 2009/0106606 | A1 | 4/2009 | Duan et al. |
| 2013/0297847 | A1 | 11/2013 | Koritnik et al. |
| 2014/0033215 | A1 | 1/2014 | Otomo |
| 2014/0043962 | A1 | 2/2014 | Rangan |
| 2014/0281079 | A1 | 9/2014 | Biskup |
| 2015/0271103 | A1 | 9/2015 | Thayalan |
| 2016/0050123 | A1 | 2/2016 | Nishanov |
| 2016/0321147 | A1 * | 11/2016 | Kizhakkiniyil ..... G06F 11/3006 |
| 2017/0155586 | A1 * | 6/2017 | Shu ....................... B60R 16/023 |
| 2018/0183657 | A1 | 6/2018 | Beilin |

OTHER PUBLICATIONS

Kvaser, "The CAN Protocol Tour—CAN Error Handling", https://www.kvaser.com/about-can/the-can-protocol/can-error-handling— retrieved from Internet Sep. 9, 2016.

Di Natale, M., "Understanding and Using the Controller Area Network" *Handout of a lecture at UC Berkeley*. Oct. 30, 2008.

Almeida, L., "Safety-critical automotive systems: New developments in CAN", Electronics Systems Lab, University of Aveiro Portugal, http://www.artist-embedded.org retrieved from Internet Mar. 15, 2017.

Navet, N., et al. "Fault Tolerant Services for Safe In-Car Embedded Systems" Oct. 26, 2004.

NHTSA, US Department of Transportation, "Accelerating the Next Revolution in Roadway Safety", Sep. 2016.

Navet, N., et al., "Automotive Embedded Systems Handbook", Industrial Information Technology Series, 2009.

International Standard, "Road Vehicles—Controller Area Network" Part 1: Data Link Layer and Physical Signalling, ISO 11898-1, Second Edition, Dec. 15, 2016.

International Standard, "Road Vehicles—Controller Area Network" Part 2: High-Speed Medium Access Unit, ISO 11898-2, Second Edition, Dec. 15, 2016.

International Standard, "Road Vehicles—Controller Area Network" Part 1: Low-Speed, Fault-Tolerant, Medium-Dependent Interface, ISO 11898-3, First Edition, Jun. 1, 2006.

International Search Report and Written Opinion of PCT/US2016/066862 dated May 31, 2017 entitled "Fault-Tolerant Operational Group on a Distributed Network".

* cited by examiner

100

200

250

Timestamp for each node in log

| | Node C | Node B | Node A | Node E | Node D |
|---|---|---|---|---|---|
| Node C | 7ms | 2ms | 2ms | 2ms | 2ms |
| Node B | 6ms | 6ms | 1ms | 1ms | 1ms |
| Node A | 5ms | 5ms | 5ms | 0ms | 0ms |
| Node E | 3ms | 3ms | 3ms | 3ms | 3ms |
| Node D | 3ms | 3ms | 3ms | 3ms | 3ms |

Log sent from Node N

Verification table 702

FAULT-TOLERANT OPERATIONAL GROUP ON A DISTRIBUTED NETWORK

BACKGROUND

With the rapid technological developments in areas such as aviation, space travel, robotics, autonomous vehicles, medical devices, and electronic financial systems, there is an increasing need for computer systems to be reliable and resilient to failure. Thus, there is an ever growing demand for reliable computing systems. Replicated computers executing identical operations can provide fault tolerance by comparing the outputs of each of the computers and determining which one of the computers may have generated an error during operation.

SUMMARY

In an embodiment of the present invention, a method receives, at a first node of multiple nodes, each node connected to a common network bus, a health message from a second node. The health message includes a log of health messages from other nodes. Each node sends health messages at a frequency known to the plurality of nodes. The method further compares, at the first node, the log of messages from other nodes in the received health message to a log of health messages previously received from other nodes stored by the first node. Based on the comparison, the method determines a health status of each node.

In an embodiment, receiving a health message further includes receiving multiple health messages from one or more of the other nodes of the plurality of nodes. Comparing further includes comparing each log of messages from the received multiple health messages to the log of health messages stored by the first node.

In an embodiment, the common bus is at least one of a controller area network (CAN) bus and an Ethernet bus.

In an embodiment, the method further includes generating, at the first node, the log of health messages from other nodes stored by the first node by recording a timestamp of each received health message from other nodes in the log during one clock cycle of the first node.

In an embodiment, determining a health status of a particular node is performed by verifying timestamps of health messages from the particular node that corresponds with timestamps in the log stored by the first node.

In an embodiment, the method further includes broadcasting, from the first node over the common network bus, a health message of the first node to the other nodes, the health status including a log of other received health messages.

In an embodiment, each node may have the same clock frequency. However, a person of ordinary skill in the art can recognize that the method can operate as long as the clock frequency of each node is known by each other node.

In an embodiment, comparing further includes determining that all health messages at the first node match timestamps of their respective nodes in the logs of health messages from the nodes. Otherwise, the method marks the nodes having unmatched timestamps as out of synchronization.

In an embodiment, the method further includes forming a fault-tolerant group with other nodes based on the determined health status of each node.

In an embodiment, the method further includes determining a health status of the first node by comparing an entry of the log of messages in the received health message corresponding to the first node to entries of the log of messages in other received health messages.

In an embodiment, a system includes a common network bus, and a plurality of nodes, each connected to the common network bus. A first node of multiple nodes is configured to receive a health message from a second node, the health message including a log of health messages from other nodes of the plurality of nodes. Each node sends health messages at a frequency known to the plurality of nodes. The system is further configured to compare, at the first node, the log of messages from other nodes in the received health message to a log of health messages previously received from other nodes stored by the first node. The system is further configured to, based on the comparison, determine a health status of each node.

In an embodiment, a non-transitory computer-readable medium is configured to store instructions. The instructions, when loaded and executed by a processor, cause the processor to receive, at a first node of multiple nodes each connected to a common network bus, a health message from a second node. The health message includes a log of health messages from other nodes of the plurality of nodes. Each node sends health messages at a frequency known to the plurality of nodes. The instructions further cause the processor to compare, at the first node, the log of messages from other nodes in the received health message to a log of health messages previously received from other nodes stored by the first node. The instructions further cause the processor to, based on the comparison, determine a health status of each node.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is a diagram illustrating an example embodiment of a verification table employed in an embodiment of the present invention.

DETAILED DESCRIPTION

Figure 1:
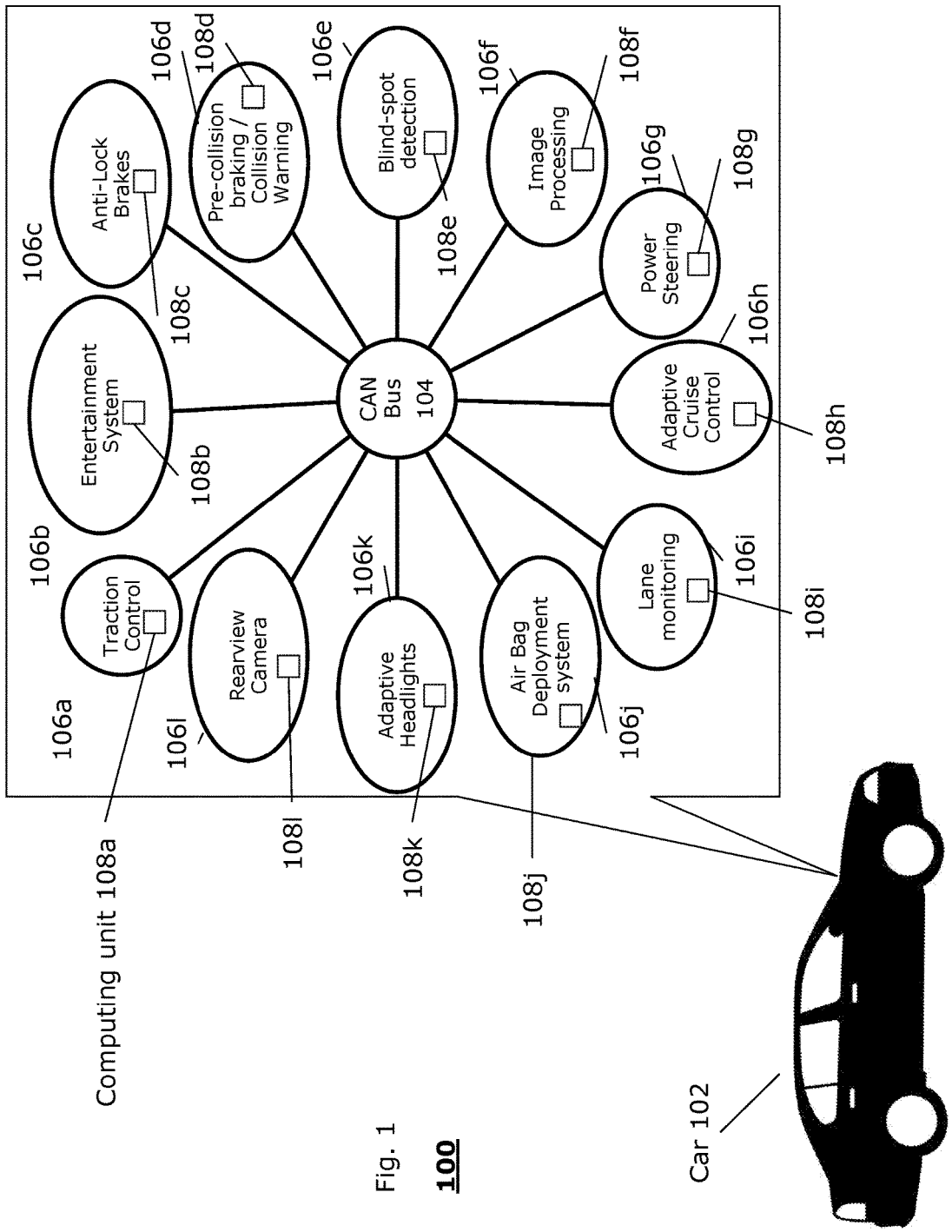
FIG. 1 is a diagram illustrating an example embodiment of a car having an illustrative controller area network (CAN) bus connecting multiple subsystems.

A description of example embodiments of the invention follows.

Previous methods of implementing fault tolerance employ nodes that are directly connected to each other. Each node independently performs the same function, and for each operation, results are compared and voted on by the other system. In voting, when there is a difference in the results, a failure can be overridden by the correctly calculated answer found by a majority of the nodes, or if there is not a majority, failure can be flagged.

In general, fault-tolerant operational groups are referred to by the number of backup systems employed. For example, a simplex is an operational group with one node, and a duplex is an operational group with two nodes. Both simplex and duplex operational groups are zero-fault-tolerant. A simplex does not have another node to check results against, and while a duplex can check each node against each other, in the case of a fault, the nodes cannot agree on which node is correct. However, the duplex can note the error, and other corrective actions can be taken, such as cancelling a launch or other operation. A one-fault-tolerant operational group is a triplex, which has three nodes. A two-fault-tolerant operational group is a quad, or quadraplex. In general, the number of nodes in an operational group is given by the formula $m=n+2$, where m is the number of nodes and n is the desired level of tolerance. A person of ordinary skill in the art can envision higher level fault-tolerant operational groups according to this formula. In these methods, each node was connected to all other nodes directly. For example, a duplex would have two lines—one from the first node to the second, and one from the second to the first. For higher-level fault-tolerant operational groups, however, many more connections are needed. For example, in a triplex, six wires are needed. In a quad, 12 wires are needed. A similar system is described in U.S. Pat. No. 8,972,772, "System and Method for Duplexed Replicated Computing," by Beilin et al., which is herein incorporated in reference in its entirety.

As systems have more and more components, however, providing individual wires between all components of a system can become prohibitive. In addition, components of the system can be spaced at distances that wires to and from each and every component in the fault-tolerant operational group can be difficult to compactly design. For example, in a semi-autonomous or fully-autonomous vehicle, components and their respective computers are in different parts of the vehicle. Many vehicles, therefore, use a controller area network (CAN) bus, which is a vehicle bus. The CAN bus is a serial communication protocol, which supports distributed real-time control and multiplexing for use within road vehicles and other control applications. The CAN bus can be implemented by the International Organization for Standardization (ISO) 11898, specifically ISO 11898-1:2003 and ISO 11898-1:2015, which are hereby incorporated by reference in their entirety. However, on a CAN bus architecture, such as ISO 11898, changes from traditional fault-tolerant monitoring have to be made to account for the lack of one-way wiring connecting each component. The ISO Standard 11898-3 describes creating redundant connections between components on the CAN bus, however, does not create fault-tolerant operational groups. In other words, if a wire of the CAN bus described by 11898-3 were severed, an alternate wire pathway would allow components on the CAN bus to continue to communicate. Instead, with each component connected via a bus, creating a fault-tolerant architecture is implemented differently, as described below.

FIG. 1 is a diagram 100 illustrating an example embodiment of a car 102 having an illustrative CAN bus 104 connecting multiple subsystems. In an embodiment of a vehicle 102, computing units 108a-1 for each vehicle system 106a-1 may be used in a distributed fashion to assist each other. The example systems of FIG. 1 are a traction control system 106a, an entertainment system 106b, an anti-lock brake system 106c, a pre-collision braking/collision warning system 106d, a blind-spot detection system 106e, an image processing system 106f, a power steering system 106g, an adaptive cruise control system 106h, a lane monitoring system 106i, an air bag deployment system 108j, an adaptive headlights system 108k, and a rearview camera system 106l. A person of ordinary skill in the art can recognize that more or less systems can be employed in the car 102 and connected via the CAN bus 104; however, the systems 106a-1 are shown for exemplary purposes.

In a broad example, the computing unit 108a-1 for a non-emergency system (e.g., the vehicle's entertainment system 106b) can assist with processing for a critical system (e.g., anti-lock braking 106c, pre-collision braking 106d, an imaging processing system 106f for imaging the vehicle's surroundings objects, etc.). In embodiments, the car 102 can organize the systems into fault-tolerant groups based on the required fault-tolerance of the required function. For example, functions that are more critical may be two-fault-tolerant, where less critical functions, such as heating or entertainment, can be no fault-tolerant. In time critical situations, however, critical functions can have a simplex as overhead, such as application by user input of the driver of the emergency brake.

The computing units 108a of each subsystem can be shared in a fault-tolerant way. As one example, consider the image processing system 106f. Image processing 106f can include stereo-vision systems, Radar, Lidar, or other vision systems, and the processing of data related to the same. In a semi-autonomous or fully-autonomous vehicle 102, image processing 106f is critical to the car's autonomous functions. An error in image processing 106f can result in the vehicle 102 failing to recognize an object on the road, which can cause a collision. Therefore, the vehicle 102 could make the image processing system as two-fault-tolerant. Doing so requires a quad, which in previous systems required four image processing systems to be connected to each other directly, all programmed to do the same function. In the present invention, however, the image processing system 106f can leverage the computing units 108a-e and 108g-1 of the other systems 106a-e and 106g-1 to verify its calculations in a distributed manner. Therefore, to emulate a quad, four of the computing units 108a-1 can perform calculations, vote on the calculations, and output a response so that the car 102 can take an appropriate action. In this way, the car distributes its computing power in a fault-tolerant way. A person of ordinary skill in the art can recognize that a triplex, duplex, or simplex can be implemented similarly. Further, any n-fault-tolerant operational group can be implemented to for any n greater than or equal to zero, even though it is uncommon for n to be greater than three. In an embodiment of the present invention, after determining health statuses of nodes, the nodes can form a fault-tolerant operational group, such as a simplex, duplex, triplex, quad, or a three-fault or higher tolerant operational group. The fault-tolerant operational group can also be referred to as a redundancy group.

A person of ordinary skill in the art can also recognize that other bus architectures or network technologies can be implemented instead of the ISO 11898 architecture. For example, wired or wireless Ethernet is one example of a network technology that can be employed in other embodiments; however, different types of networks other than Ethernet can be used. A person of ordinary skill in the art can employ Ethernet with the principles described in relation to the CAN bus 104 in this application, and is not described separately. However, it is noted that in an Ethernet system, packet collisions have to be accounted for, which is not a factor with the CAN bus 104. In an Ethernet network, packets that collide are resent at a later time with an updated timestamp. Therefore, to use an Ethernet network, nodes can consider that packets may be delayed due to packet collision before determining that a node that has not sent an anticipated health message is experiencing a fault. While many methods can perform this, one embodiment is delaying determination of health of a particular node during periods of high network congestion.

Figure 2A:
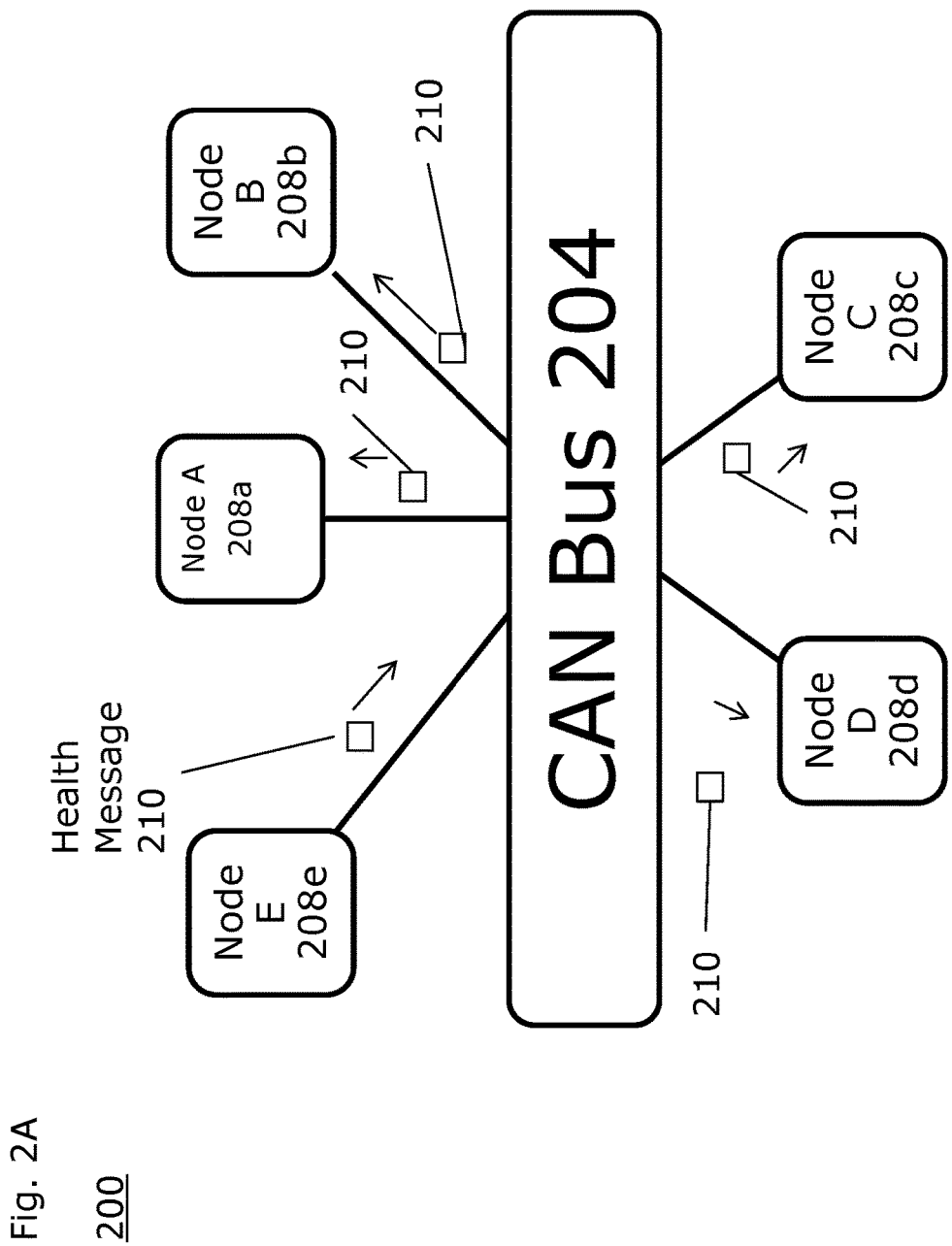
FIG. 2A is a block diagram illustrating an example embodiment of a CAN Bus connected with nodes.

FIG. 2A is a block diagram 200 illustrating an example embodiment of a CAN Bus 204 connected with Nodes A-E 208*a-e*. The nodes 208*a-e* can represent, for example, computing units 108*a*-1 of FIG. 1. However, nodes 208*a-e* can further represent any computing unit in a fault-tolerant operational group. In an example embodiment, the nodes 208*a-e* can represent four nodes of a quad of a two-fault-tolerant system, and one additional voting node that regulates. Regardless of the functions of the nodes, each has to confirm that the others are communicating the correct data with each other. To this end, each node 208*a-e* sends out its own health message 210 on a clock that is known to all of the other nodes 208*a-e*. In other words, each node 208*a-e* knows the clock speed of the other nodes 208*a-e*. Each node 208*a-e* can have the same clock speed or different clock speeds. As one node, such as node E 208*e*, sends a health message 210 to the CAN bus 204, the message is subsequently received at Nodes A-D 208*a-d*. In an embodiment, the message 210 can be broadcast to all nodes on the CAN bus 204. In other embodiments; however, the message 210 can be multicast to specific nodes on the CAN bus 204

During an initialization cycle, the health message 210 may only include data about node E 208*e*. However, after one cycle, each health message 210 should include data about the other nodes A-D 208*a-d* as well. This is accomplished by, at each node, recording when respective health messages are received from each node. Then, in the next health message, the node includes a log of all other health messages it has received. In this way, each node can compare its log of (a) received health messages and (b) its own sent health messages to the log of health messages received from other nodes. If the two logs of a first node match the logs received in a health message from a second node, then the first node can verify that its connection to the second node is receiving messages correctly. When performed at all nodes, this can verify the entire network. Conversely, if the logs do not match, this can be an indication that one or more of the nodes are malfunctioning or communicating incorrectly. In this event, the first node can flag the second node, which can trigger several options, including demoting the second node in voting, or flagging the second node for service.

Figure 2B:
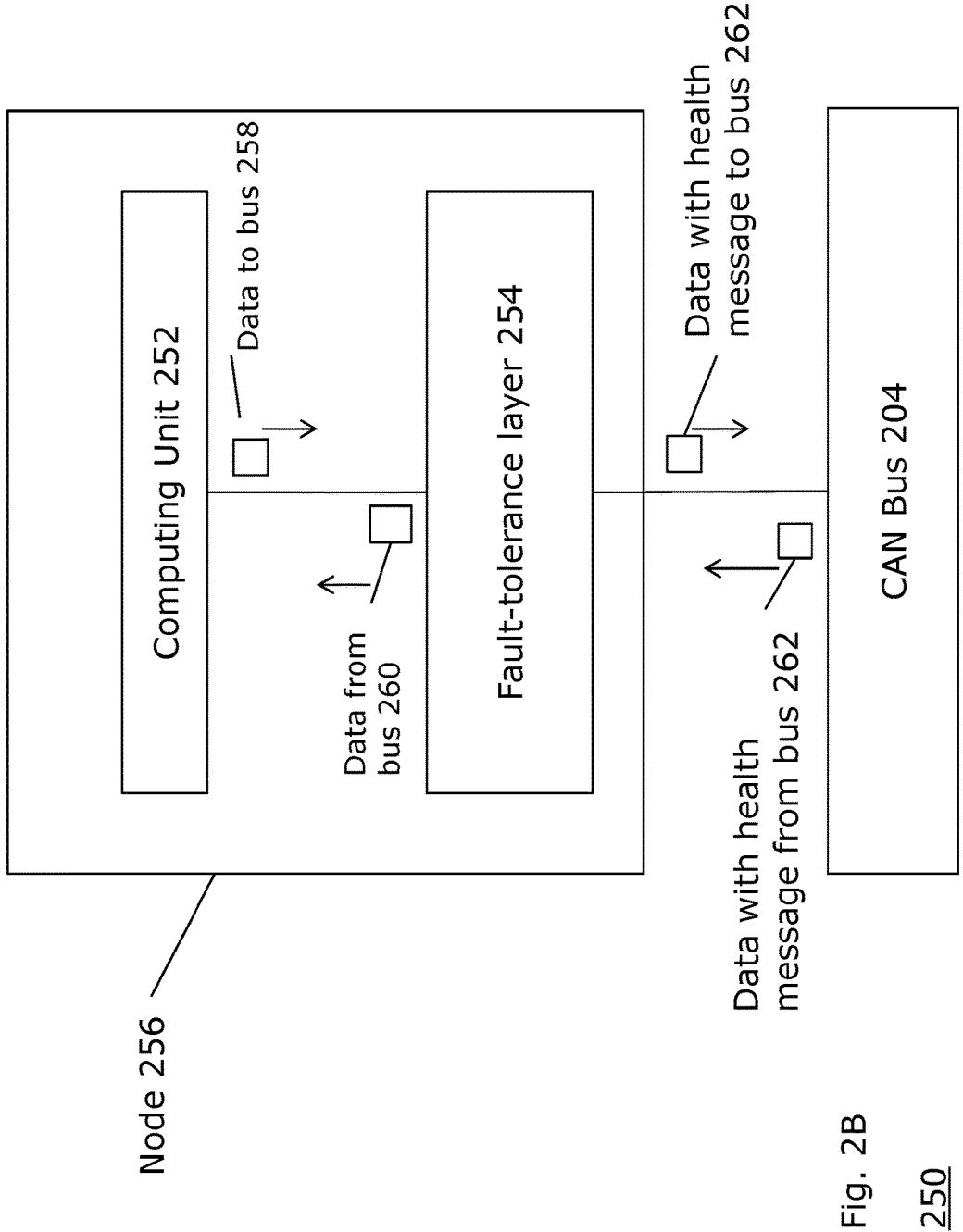
FIG. 2B is a block diagram illustrating an example embodiment of a node having a computing unit and fault-tolerance layer that is operatively coupled with a CAN Bus.

FIG. 2B is a block diagram illustrating an example embodiment of a node 256 having a computing unit 252 and fault-tolerance layer 254 that is operatively coupled with a CAN Bus 204. The node 256 of FIG. 2B is an example embodiment of any of the nodes A-E 208*a-e*. The node 256 can implement, for example, any of the systems 106*a*-1 shown in FIG. 1, but can implement any other system as well. The node 256 includes a computing unit 252 that determines, computationally, needed data to be sent to the bus 258 in response to data received from the bus 260. In an embodiment, the data received from the bus can be requests to perform operations from other nodes connected to the CAN bus 204. In another embodiment, the computing unit 252 can calculate data based on real-world input, such as a pedestrian being detected by the vehicle. After the data is calculated, the data to the bus 258 is first sent to a fault-tolerance layer 254. The fault-tolerance layer 254 appends a health message, described further in relation to FIG. 3, to the data packet. The data with the health message 262 is then sent to the CAN bus 204. In an embodiment, the health message 210 can be added to the data 258 to become the data 262 with health message.

The fault-tolerance layer 254 further receives data from the CAN bus 204 having health messages from other nodes. The fault-tolerance layer 254 determines health of the other nodes as well as the node 256 itself, before sending the data 260 to the computing unit 252 for processing. In this manner, the fault-tolerance layer 254 abstracts away fault-tolerant management from computing units 252 of any nodes. The fault-tolerance layer 254 can be implements in software by a processor, or also in hardware by an FPGA, or other hardware device.

Figure 3:
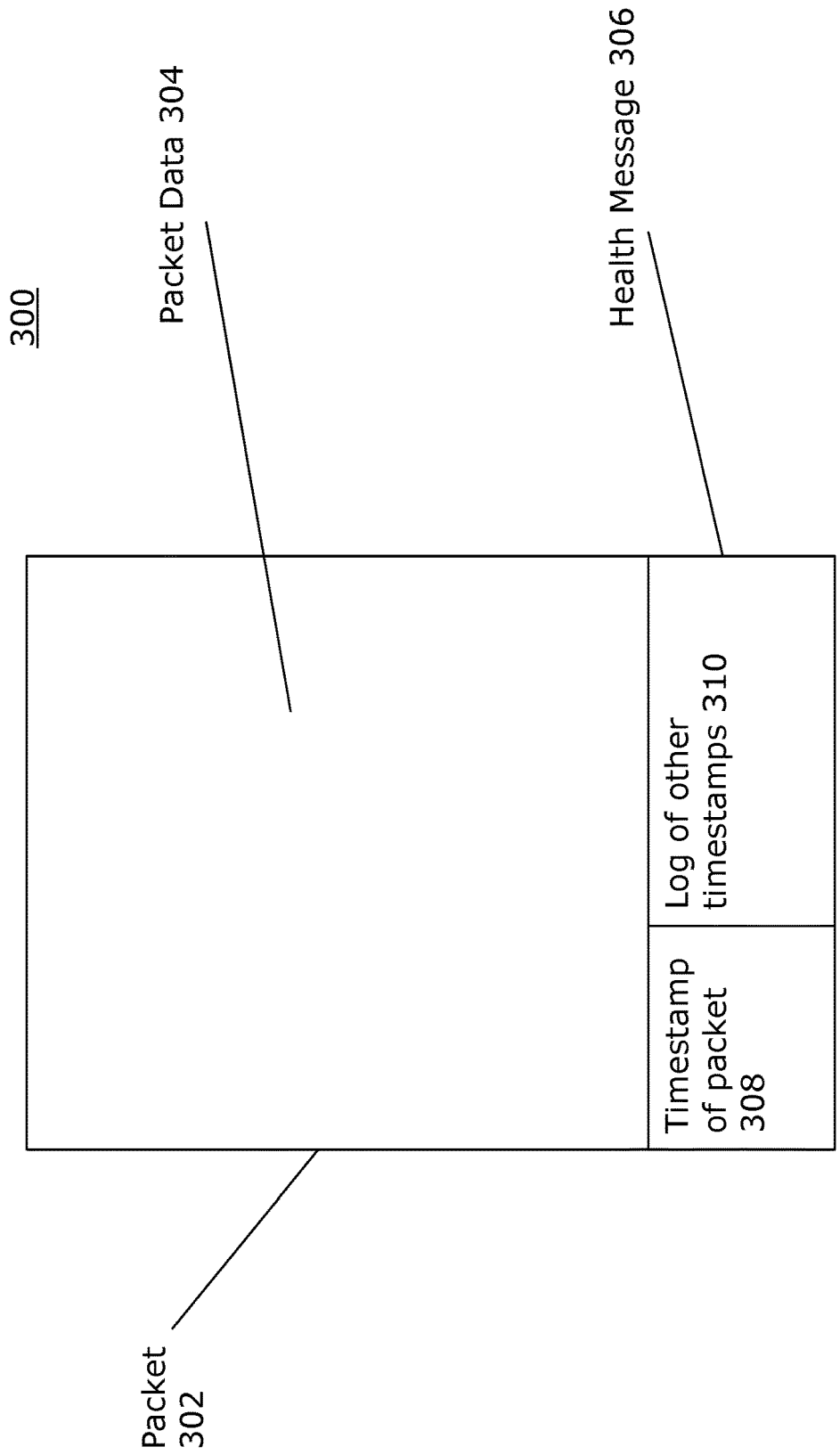
FIG. 3 is a diagram of an example embodiment of a packet with a health message.

FIG. 3 is a diagram 300 of an example embodiment of a packet 302 with a health message 306. The packet 302 includes packet data 304, but further includes the health message 306. The health message 306 includes two components, a timestamp 308 of the packet, and a log 310 of other timestamps 310. The log 310 may be empty or incomplete during an initialization clock cycle due to lack of received data.

As nodes communicate with one another, a cyclic redundancy check (CRC) hash, check bits, or a check sum, are appended to each packet 302. As is known in the art, the CRC is an error detecting code that is first calculated by a sending node, and then attached to the packet 302. The length of the message is either pre-determined or encoded into the message so the receiving node knows which part of the message is the CRC or checksum. Then, the receiving node calculates the CRC based on the packet data 304 and, optionally, health message 306, and confirms that the received CRC matches the CRC appended to the packet 302. This verifies that no accidental data changes have been made to the packet 302.

In addition to the above CRC information, the health message 306 can also include a timestamp of the packet 308, and a log of other timestamps 310. This information can be, separate from the CRC information, also checked against timestamp logs in each corresponding node after transmission of each packet.

Figure 4:
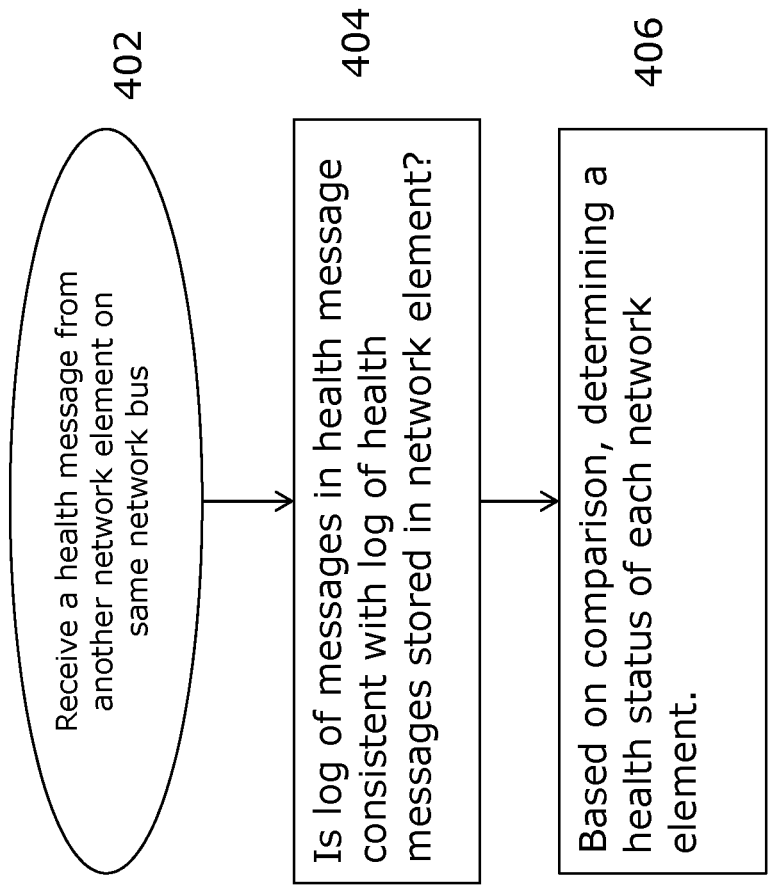
FIG. 4 is a flow diagram illustrating an example embodiment of a process employed by the present invention.

FIG. 4 is a flow diagram 400 illustrating an example embodiment of a process employed by the present invention. First, the process receives a health message from another network element on a same network bus (402). The health message can be, as described above, appended to a data packet as a timestamp and a log of timestamps of other health messages received from other nodes, or CRC information, or both. The process then checks whether the log of messages in the health message is consistent with the log of health messages stored by the network element (404). Based on this comparison, the process determines a health status of each network element (406).

Figure 5:
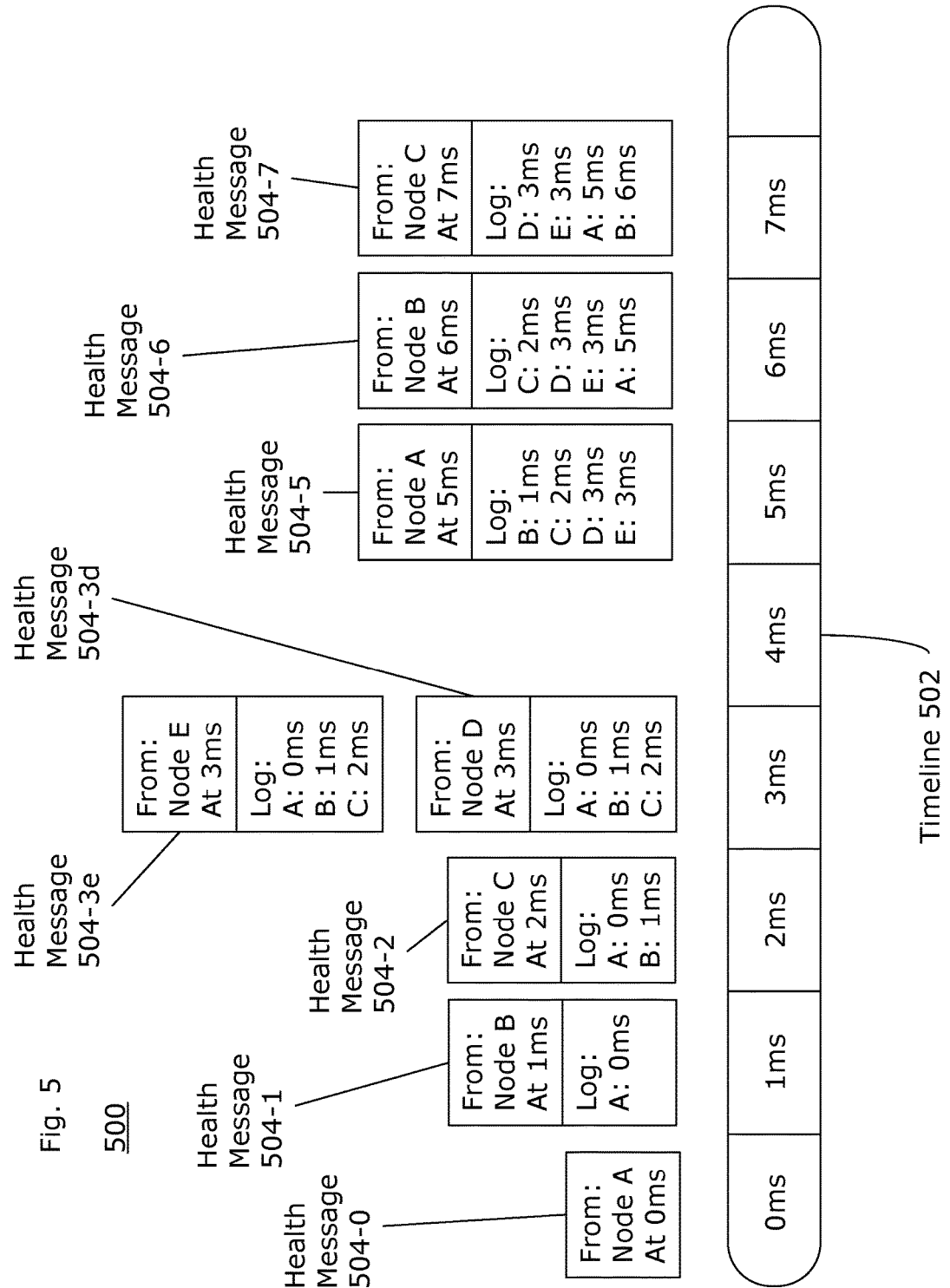
FIG. 5 is a diagram illustrating an example embodiment of a timeline of health messages.

FIG. 5 is a diagram 500 illustrating an example embodiment of a timeline 502 of health messages 504-(0-7). A person of ordinary skill in the art can recognize that the health messages 504-(0-7) can be appended to data packages, or in another embodiment, independent messages. A person of ordinary skill in the art can further recognize that while the timeline 502 is on the millisecond scale, any other timescale can be used. Further, a person of ordinary skill in the art can recognize that each network element may send messages at different frequencies or the same frequencies as other nodes on the bus. The health messages can be sent sequentially, simultaneously, or any combination thereof. This example assumes that each message is successfully received by each other node.

The health messages 504-(0-3) can be considered initialization health messages that fill up empty logs at the respective Nodes A-E. The health messages 504-(5-7), on the other hand, are sent after the initialization phase. In an embodiment, the health messages sent after the initialization phase edit their respective logs as a rolling queue. In another embodiment, shown in relation to FIGS. 7-8, the nodes edit their respective verification table or verification matrix.

A first health message 504-0 is sent from Node A at t=0 ms across the bus to Nodes B-E. If it is successfully received, each other node adds to its log that a health message from Node A was received with a timestamp of 0 ms.

A second health message 504-1 is sent from Node B at t=1 ms across the bus to Nodes A and C-E. This health message 504-1 includes a log of health messages received from other nodes. At this point, the log includes the representation of the message from Node A received with a timestamp of 0 ms.

A third health message 504-2 is sent from Node C at t=2 ms across the bus to Nodes A-B and D-E. The health message 504-3 includes a log of health messages received from other nodes. At this point, the log of the health message 504-3 includes the representation of the message from Node A received with a timestamp of 0 ms and the message from Node B received with a timestamp of 1 ms.

Fourth and fifth health messages 504-3d and 504-3e are sent from, respectively, Node D and Node E, across the bus to, respectively, Nodes A-C and E, and Nodes A-D at t=3 ms. At this point, the log of both health messages 504-3d and 504-3e includes the representations of the message from Node A received with a timestamp of 0 ms, the message from Node B received with a timestamp of 1 ms, and the message from Node C with a timestamp of 2 ms.

A person of ordinary skill in the art can recognize that the fourth and fifth messages 504-3d and 504-3e are an example of messages sent on the CAN bus in parallel. As a whole, the example health messages illustrated in FIG. 5 show that messages can be sent either in parallel or sequentially on a CAN bus. As described above, however, if using an Ethernet network, messages sent at the same time have a packet collision, and one or more may be resent according to Ethernet network protocol. A person of ordinary skill in the art can also recognize that in an Ethernet network, messages may not be sent in parallel, but can be sent in sequence shortly after each other. Further, a person of ordinary skill in the art can recognize that no messages are sent at 4 ms. This represents the fact that there may be idle periods on the CAN bus.

At this point, all Nodes A-E have sent health messages across the bus. Therefore, the log at each node has data points of last health messages from each other node. In this embodiment, the log replaces indications of health messages at a node with any newly received health message.

Likewise, at 5 ms, Node A sends a health message 504-5 across the bus with the log including the representations of the message from the message from Node B received with a timestamp of 1 ms, the message from Node C at 2 ms, the message from Node D with a timestamp of 3 ms, and the message from Node E with a timestamp of 3 ms. In this embodiment, the log does not include an entry for Node A because the health message itself can represent itself. However, in other embodiments, the log can be more explicit, or even include multiple iterations of messages from multiple nodes.

At t=6 ms, Node B sends a health message 504-6 across the bus with the log including the representations of the message from the message from the message from Node C at 2 ms, the message from Node D with a timestamp of 3 ms, the message from Node E with a timestamp of 3 ms, and the message from node A with a timestamp of 5 ms.

At t=7 ms, Node C sends a health message 504-7 across the bus with the log including the representations of the message from the message from the message from the message from Node D with a timestamp of 3 ms, the message from Node E with a timestamp of 3 ms, and the message from Node A with a timestamp of 5 ms, and Node B with a timestamp of 6 ms.

The health messages show in FIG. 5, therefore, can be analyzed by the nodes they are received at to ensure that communication channel from the node that sent the health message to the node receiving the health message is functioning properly. The communication channel can be verified by performing the CRC checks described above. The communication channel can be further verified by comparing the timestamps in each health message to timestamps of health messages received at each node, on a per-node basis, which can collectively verify the entire network of nodes. Both of these checks can be performed, or in other embodiments, one check can be performed. A person of ordinary skill in the art could further envision other ways to verify message integrity from one node to another.

A person of ordinary skill in the art can recognize that the examples described herein illustrate, for simplicity, the health messages being sent all on the same frequency. However, a person of ordinary skill in the art can configure the described system to operate when health messages are sent across the bus at different frequencies as well. In this event, all nodes must know the frequency that each other nodes are sending their messages. With this knowledge, the nodes can determine accurately whether a particular node's health message should have been received or not. In other words, for a receiving node to check a given node, the receiving node can compare the time it last received a message from the receiving node to the receiving node's known frequency of sending health messages. If more time has elapsed than the frequency, the communication channel with the node may be faulty. This embodiment of nodes sending messages at different, but known, frequencies, can be applied to the other embodiments described herein.

Figure 6:
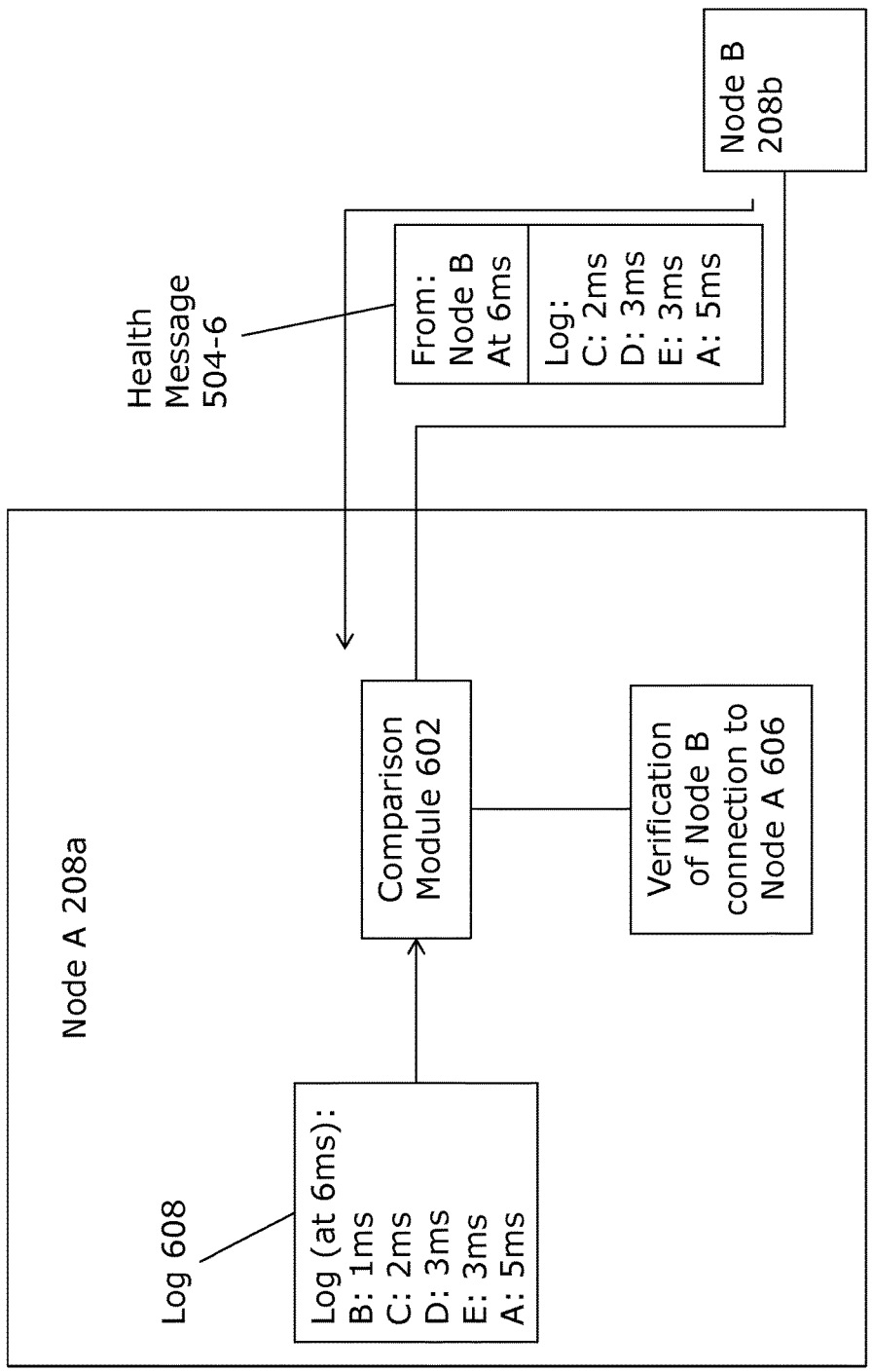
FIG. 6 is a block diagram illustrating verification of a communication line.

FIG. 6 is a block diagram 600 illustrating verification of a communication line. In an embodiment, the verification is performed at Node A 208a on its communication line from Node B 208b, previously described in relation to FIG. 2. Node B 208b sends health message 504-6, as described in relation to FIG. 5, to a comparison module 602 of Node A

208a. The comparison module 602 compares the health message 504-6 and its log to Node A's 208a log 608. In the comparison, the entries for Nodes C, D, E, and A are consistent. The log 608 also includes an entry for Node B at 1 ms, because it has not replaced Node B's current health message 504-6 yet. However, the comparison module 602 can take this into account, and allow verification of Node B's connection to Node A 606.

However, if the health message 504-6 entries did not match entries of the log 608, then the system can mark the communication link as unverified. The system can flag Node A 208a or Node B 208b as faulty, for example. The system can also send messages to compare all verifications of other nodes. This may reveal, for example, that Node B's 208b messages to all other nodes on the network were corrupted, and the rest of the nodes can assume Node B is faulty. In another example, described below, collectively received logs can be compared at a node to determine the source of a network problem or fault in a node.

FIG. 7 is a diagram 700 illustrating an example embodiment of a verification table 702 employed in an embodiment of the present invention. A verification table 702 is constructed based on received logs from each node at a particular node. The verification table 702 can be the same at each node, assuming each node has received each health message and each corresponding log correctly. In embodiments, a separate log (e.g., log 208 of FIG. 6) can be maintained for the health message received at each node. However, the verification table 702 is an alternative embodiment that is more robust, as it stores the timestamps of the messages received at the particular node, as well as the timestamps of the logs from all of the health messages.

The verification table 702 represents the logs received from each node's most recent health message. Each column of the verification table 702 represents a log from the node listed in the header. Each row of the verification table 702 represents the timestamp of each particular node on the network. Therefore, the cell at Column "Node A" and Row "Node E" represents the timestamp of Node E in Node A's most recent health message log.

A person of ordinary skill in the art can further recognize that the verification table 702 can be expanded to store more logs than each node's most recent log. For example, the verification table 702 can be extended into a verification matrix that is a collection of multiple verification tables, each layer representing previous sets of health messages received. However, if one verification table 702 is used, the table can overwrite past entries as new health messages arrive.

Some of the data in the verification table 702 can be compared to determine whether a fault or communication error has occurred, however, some of the data is out of date. For example, the shaded cells in the verification table represent the time that the health message was sent from that particular node (e.g., Node A sent its health message at 5 ms, Node B send its health message at 6 ms, etc.). In the table, the data in each row can be compared to verify the connection. The node is arranged starting at Node C, each row and column organized sequentially backwards in time based on the last health message received from each node. This makes it easier to visualize new data and out of date data.

For example, Nodes D and E are the simple case where all timestamps match across all nodes, and therefore, those connections can be verified across the entire network. These cases are made simple by the fact that at the time the verification was captured, t=7 ms, nodes D and E had not sent any updates since their last update.

However, a more complex analysis applies to the times, for example, regarding Node A. The entries of Node A in the logs of Nodes C, B, and A are the same, i.e., 5 ms, but the entries in the logs of Node E and D are different, i.e., 0 ms. The process can determine that Nodes D and E are not in error, but simply out of date, by checking that the health message from Nodes D and E were both sent at 3 ms—and therefore, a timestamp of 5 ms could not have been included in its last message. However, embodiments of the invention can include an embodiment of the verification table 702 including two or more versions of timestamp logs from all nodes. In this way, out of date timestamps can be compared to timestamps on a previous clock cycle.

However, in the general case, the process can verify nodes having logs with the same timestamp in each of their health messages, as long as those health messages are sent at the same time or later than the timestamp. For recorded timestamps of a node that are before the last reported timestamp of that node, these nodes can be compared to the last clock cycle of timestamps, or, in the alternative, be ignored until a more current health message.

Figure 8:
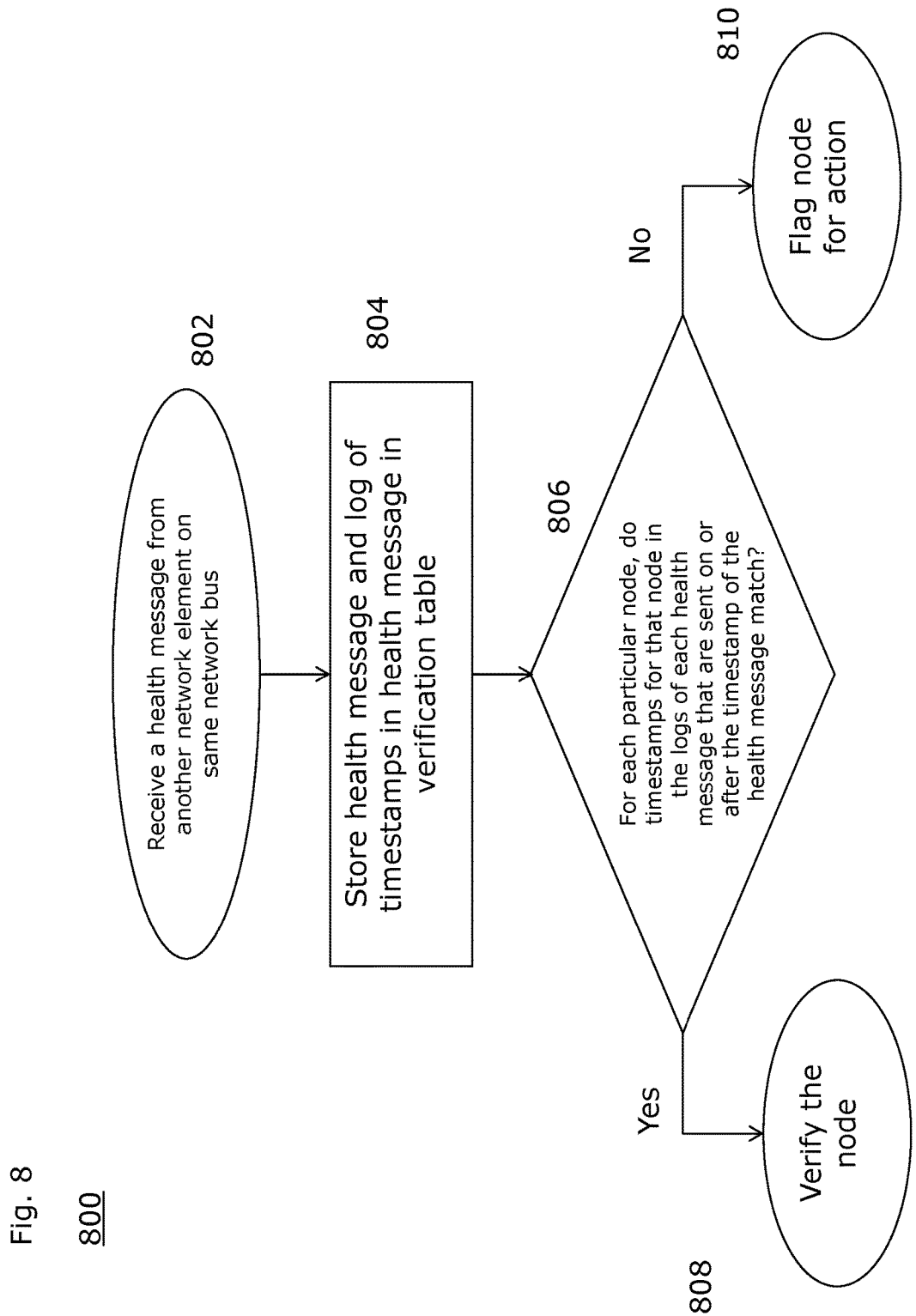
FIG. 8 is a flow diagram illustrating an example embodiment of a process employed by the present invention in relation to the above described verification table.

FIG. 8 is a flow diagram 800 illustrating an example embodiment of a process employed by the present invention in relation to the above described verification table. The process begins by receiving a health message from another network element on a same network bus (802). Then, the process stores the health message and the log of timestamps in the health message in a verification table (804). By doing this across multiple health messages, the verification table grows to include a history of all messages. A person of ordinary skill in the art can recognize that the verification table can store health messages indefinitely, for a set period of time, for a set period of clock cycles, or other configurable period of time. Then, the process determines whether, for each particular node, the timestamps for that particular node in the logs of each health message, now stored in the verification table, that are sent on or after the timestamp of the health message match each other (806). If so, the process verifies the particular node as properly functioning (808). If not, the process flags the node for action (810), such as taking the node out of service, disabling voting of the node, etc.

A person of ordinary skill in the art can further recognize that the above method can be performed without formally assembling a verification table, but can store the multiple health messages in a memory or database, and retrieve each timestamp separately for each comparison. However, assembling the verification abstracts away such data retrieval and aids the processing of the comparison.

Figure 9:
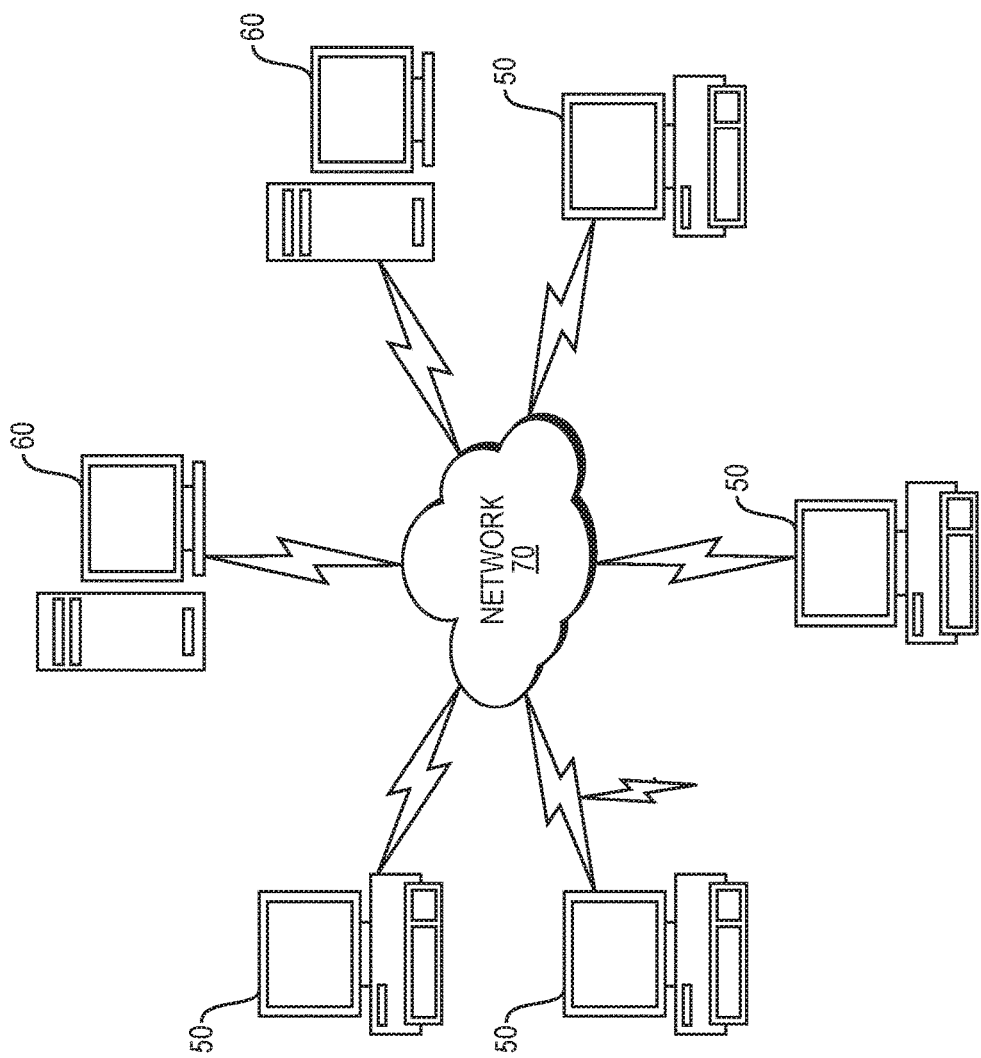
FIG. 9 illustrates a computer network or similar digital processing environment in which embodiments of the present invention may be implemented.

FIG. 9 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, a registered trademark of Bluetooth SIG, Inc., etc.) to communicate with one another. Other electronic device/computer network architectures are suitable.

Figure 10:
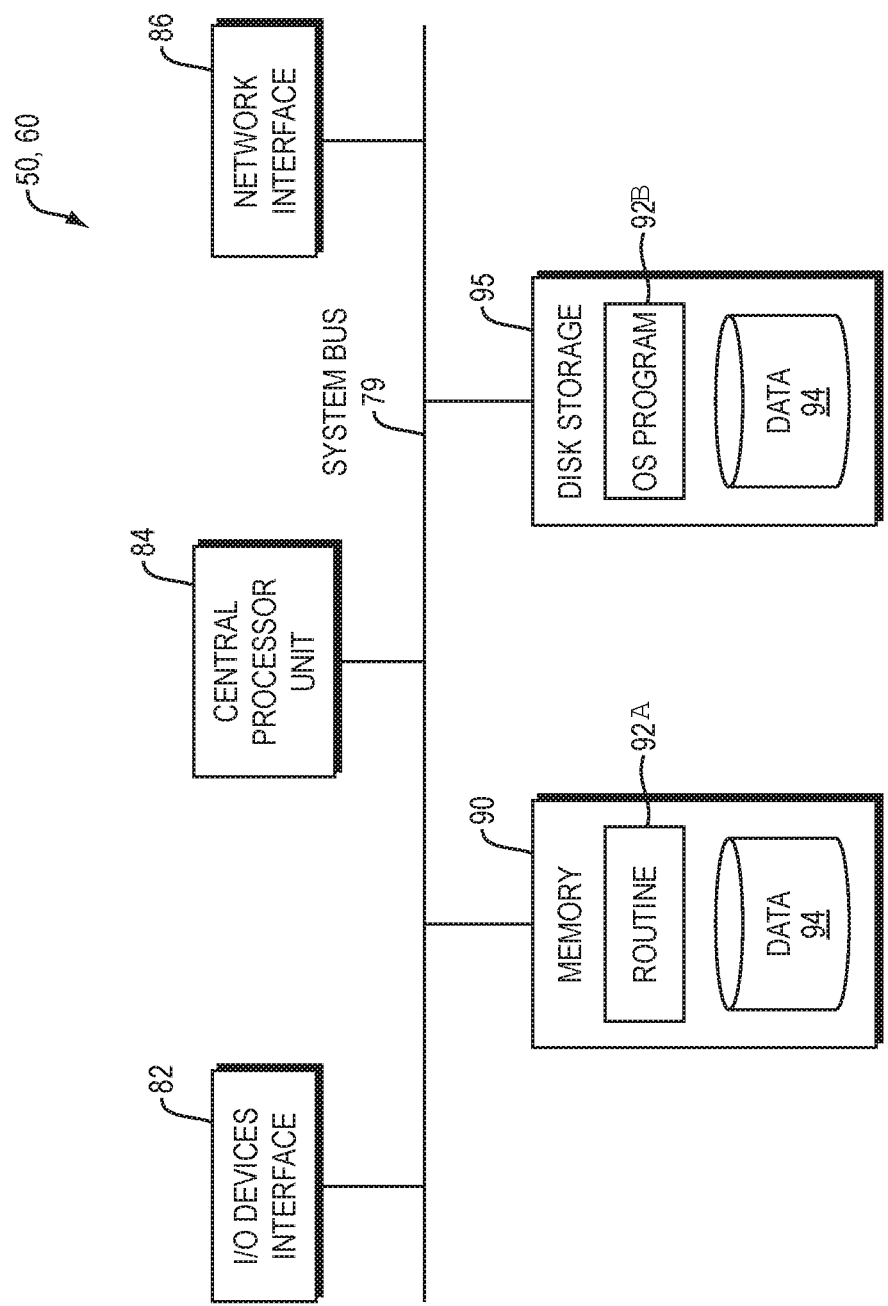
FIG. 10 is a diagram of an example internal structure of a computer (e.g., client processor/device or server computers) in the computer system of FIG. 9.

FIG. 10 is a diagram of an example internal structure of a computer (e.g., client processor/device 50 or server computers 60) in the computer system of FIG. 9. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (e.g., comparison module, CAN bus, and verification table generation code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   receiving, at a first node of a plurality of nodes each connected to a common network bus, a health message from a second of the plurality of nodes, the health message including a log of health messages from other nodes of the plurality of nodes, each node sending health messages at a frequency known to the plurality of nodes;
   comparing, at the first node, the log of messages from other nodes in the received health message to a log of health messages previously received from other nodes stored by the first node; and
   based on the comparison, determining a health status of each node by verifying timestamps of health messages from each node correspond with timestamps in the log stored by the first node.

2. The method of claim 1, wherein receiving a health message further includes receiving multiple health messages from one or more of the other nodes of the plurality of nodes, and
   wherein comparing further includes comparing each log of messages from the received multiple health messages to the log of health messages stored by the first node.

3. The method of claim 1, wherein the common bus is at least one of a controller area network (CAN) bus and an Ethernet bus.

4. The method of claim 1, further comprising:
   generating, at the first node, the log of health messages from other nodes stored by the first node by recording a timestamp of each received health message from other nodes in the log during one clock cycle of the first node.

5. The method of claim 1, further comprising:
   broadcasting, from the first node over the common network bus, a health message of the first node to the other nodes, the health status including a log of other received health messages.

6. The method of claim 1, wherein each node has the same clock frequency.

7. The method of claim 1, wherein comparing further includes determining that all health messages at the first node match timestamps of their respective nodes in the logs of health messages from the plurality of nodes; and
   otherwise, marking the nodes having unmatched timestamps as out of synchronization.

8. The method of claim 1, further comprising forming a fault-tolerant group based on the determined health status of each node.

9. The method of claim 1, further comprising determining a health status of the first node by comparing an entry of the log of messages in the received health message corresponding to the first node to entries of the log of messages in other received health messages.

10. A system comprising:
    a common network bus; and
    a plurality of nodes, each connected to the common network bus;
    wherein a first node of a plurality of nodes is configured to:
    receive a health message from a second of the plurality of nodes, the health message including a log of health messages from other nodes of the plurality of nodes, each node sending health messages at a frequency known to the plurality of nodes;
    compare, at the first node, the log of messages from other nodes in the received health message to a log of health messages previously received from other nodes stored by the first node; and
    based on the comparison, determine a health status of each node by verifying timestamps of health messages from each node correspond with timestamps in the log stored by the first node.

11. The system of claim 10, wherein receiving a health message further includes receiving multiple health messages from one or more of the other nodes of the plurality of nodes, and wherein comparing further includes comparing each log of messages from the received multiple health messages to the log of health messages stored by the first node.

12. The system of claim 10, wherein the common bus is at least one of a controller area network (CAN) bus and an Ethernet bus.

13. The system of claim 10, wherein the first node is further configured to:
generate the log of health messages from other nodes stored by the first node by recording a timestamp of each received health message from other nodes in the log during one clock cycle of the first node.

14. The system of claim 10, wherein the first node is further configured to:
broadcast, over the common network bus, a health message of the first node to the other nodes, the health status including a log of other received health messages.

15. The system of claim 10, wherein each node has the same clock frequency.

16. The system of claim 10, wherein comparing further includes determining that all health messages at the first node match timestamps of their respective nodes in the logs of health messages from the plurality of nodes; and
otherwise, marking the nodes having unmatched timestamps as out of synchronization.

17. The system of claim 10, wherein the first node is further configured to form a fault-tolerant group with other nodes based on the determined health status of each node.

18. T The system of claim 10, wherein the first node is further configured to determine a health status of the first node by comparing an entry of the log of messages in the received health message corresponding to the first node to entries of the log of messages in other received health messages.

19. A non-transitory computer-readable medium configured to store instructions, the instructions, when loaded and executed by a processor, causes the processor to:
receive, at a first node of a plurality of nodes each connected to a common network bus, a health message from a second of the plurality of nodes, the health message including a log of health messages from other nodes of the plurality of nodes, each node sending health messages at a frequency known to the plurality of nodes;
compare, at the first node, the log of messages from other nodes in the received health message to a log of health messages previously received from other nodes stored by the first node; and
based on the comparison, determine a health status of each node by verifying timestamps of health messages from each node correspond with timestamps in the log stored by the first node.

20. The non-transitory computer-readable medium of claim 19, wherein receiving a health message further includes receiving multiple health messages from one or more of the other nodes of the plurality of nodes, and
wherein comparing further includes comparing each log of messages from the received multiple health messages to the log of health messages stored by the first node.

21. The non-transitory computer-readable medium of claim 19, wherein the common bus is at least one of a controller area network (CAN) bus and an Ethernet bus.

22. The non-transitory computer-readable medium of claim 19, wherein the instructions further cause the processor to:
generate, at the first node, the log of health messages from other nodes stored by the first node by recording a timestamp of each received health message from other nodes in the log during one clock cycle of the first node.

* * * * *